(12) United States Patent
Takaishi

(10) Patent No.: US 7,684,142 B2
(45) Date of Patent: Mar. 23, 2010

(54) DISK DEVICE, POSITIONING CONTROL CIRCUIT AND INFORMATION PROCESSING APPARATUS USING SAME

(75) Inventor: Kazuhiko Takaishi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 827 days.

(21) Appl. No.: 11/486,307

(22) Filed: Jul. 13, 2006

(65) Prior Publication Data

US 2007/0230022 A1    Oct. 4, 2007

(30) Foreign Application Priority Data

Mar. 31, 2006   (JP)   ............... 2006-097198

(51) Int. Cl.
*G11B 5/596* (2006.01)
(52) U.S. Cl. .................. 360/77.02; 360/78.04
(58) Field of Classification Search ........ None
See application file for complete search history.

(56) References Cited

U.S. PATENT DOCUMENTS

| | | | | |
|---|---|---|---|---|
| 6,417,983 | B1 * | 7/2002 | Yatsu | 360/77.04 |
| 6,504,670 | B1 * | 1/2003 | Dittmar | 360/78.07 |
| 6,768,607 | B2 * | 7/2004 | Ottesen et al. | 360/77.02 |
| 6,927,934 | B2 * | 8/2005 | Atsumi | 360/77.08 |
| 7,019,934 | B1 | 3/2006 | Andersen | |
| 2001/0003497 | A1 | 6/2001 | Takaishi | |
| 2003/0112547 | A1 | 6/2003 | Koso et al. | |
| 2004/0213100 | A1 * | 10/2004 | Iwashiro | 369/44.32 |
| 2005/0128635 | A1 | 6/2005 | Shibata | |
| 2005/0243458 | A1 * | 11/2005 | Iwashiro | 360/77.02 |
| 2006/0291355 | A1 | 12/2006 | Coolen et al. | |
| 2007/0183076 | A1 * | 8/2007 | Baugh et al. | 360/75 |

FOREIGN PATENT DOCUMENTS

| | | |
|---|---|---|
| JP | 2000-021104 | 1/2000 |
| JP | 2005-063491 | 3/2005 |
| JP | 2005-174510 | 6/2005 |
| JP | 2006-073178 | 3/2006 |
| WO | WO 2005/024808 A1 | 3/2005 |

* cited by examiner

*Primary Examiner*—Jason C Olson
(74) *Attorney, Agent, or Firm*—Greer, Burns & Crain, Ltd.

(57) ABSTRACT

A disk device has a positioning control system which has a disturbance suppression function in which the disturbance is suppressed quickly to prevent vibration of the head. In a positioning system having a disturbance suppression function of a disk device, an interface circuit for setting a known disturbance frequency to an initial value from the outside is installed. An unknown disturbance frequency can be immediately suppressed, or disturbance frequency control can be started from a known disturbance frequency, and even if the frequency changes thereafter, the estimated frequency can follow up to the disturbance, and the vibration of the head can be quickly prevented.

18 Claims, 12 Drawing Sheets

Servo Mark
Gray Code
Index
PosA  PosB  PosC  PosD

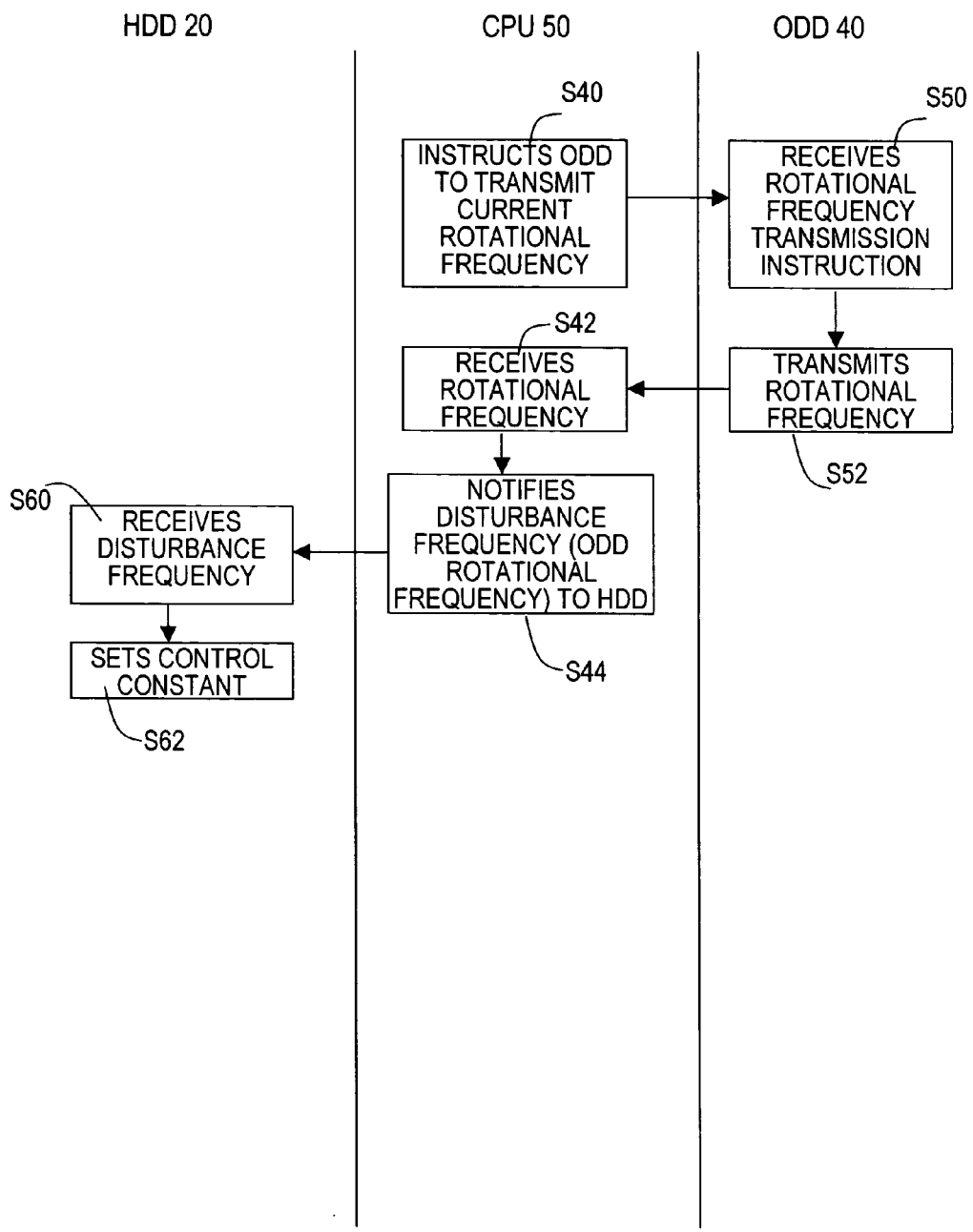

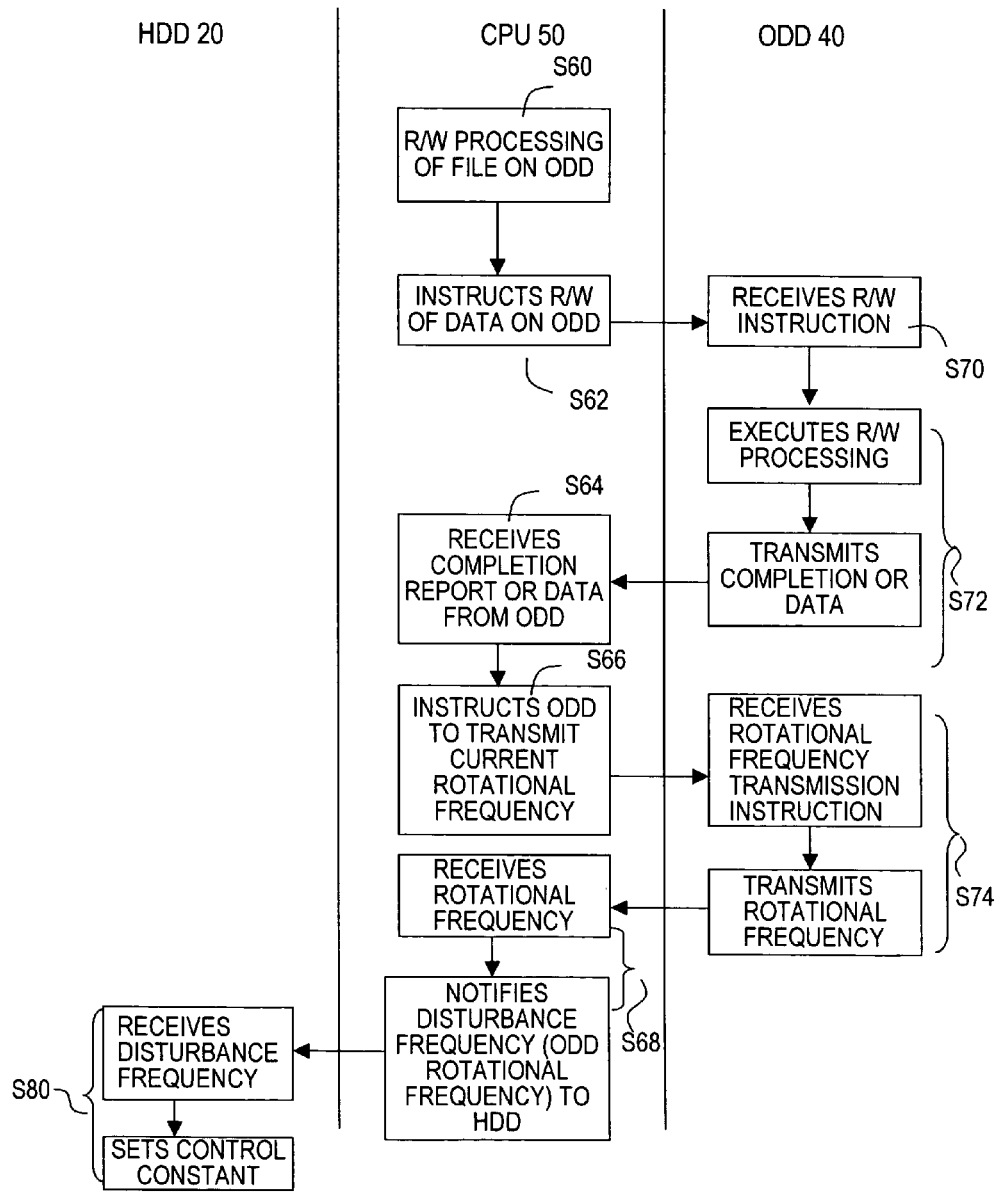

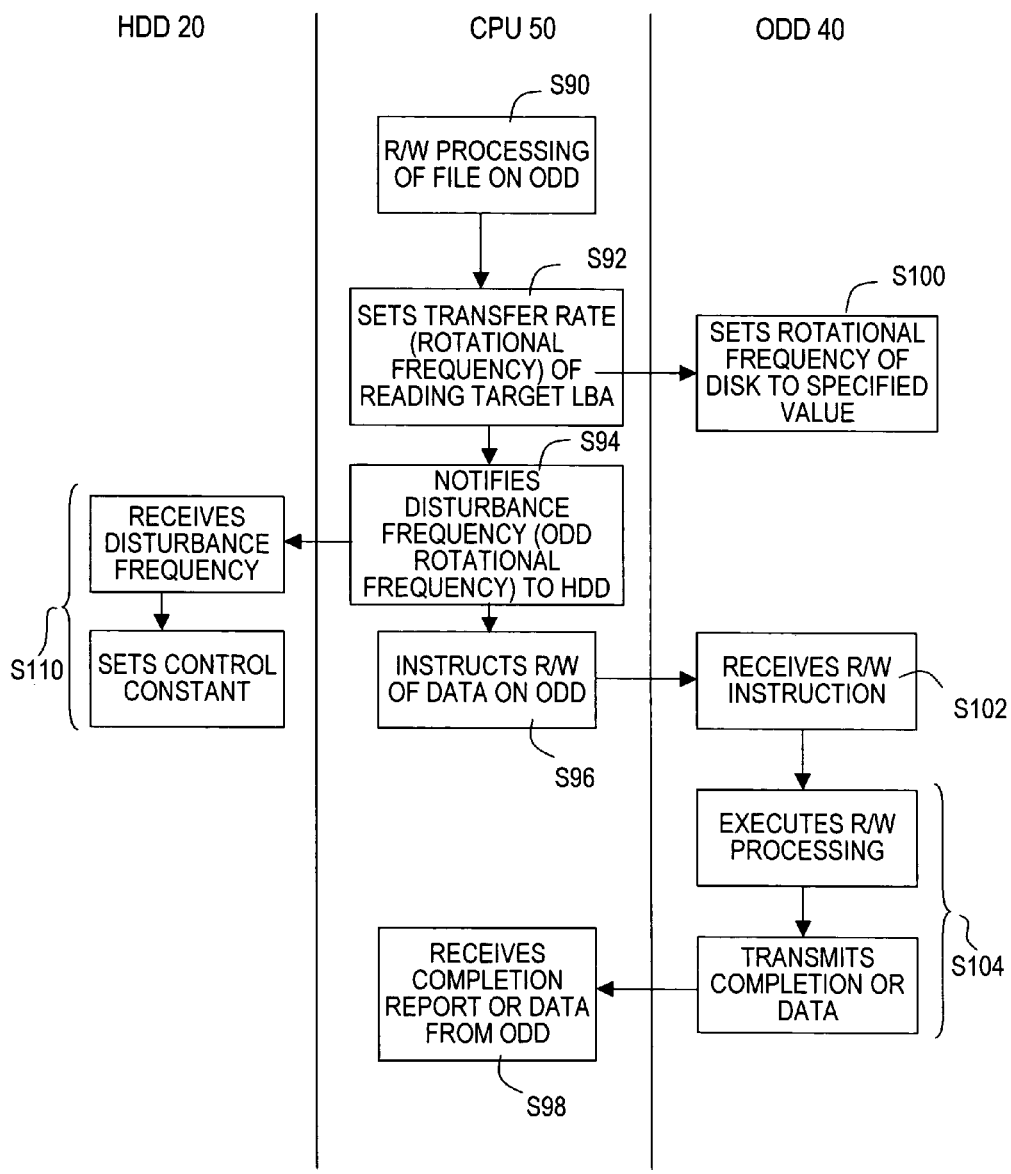

DISK DEVICE, POSITIONING CONTROL CIRCUIT AND INFORMATION PROCESSING APPARATUS USING SAME

CROSS-REFERENCE TO RELATED APPLICATIONS

This application is based upon and claims the benefit of priority from the prior Japanese Patent Application No. 2006-097198, filed on Mar. 31, 2006, the entire contents of which are incorporated herein by reference.

BACKGROUND OF THE INVENTION

1. Field of the Invention

The present invention relates to a disk device and a positioning control circuit for controlling the positioning of a head by suppressing the position shift caused by external vibration, and information processing apparatus using them, and more particularly to a disk device and a positioning control circuit for suppressing the vibration of a head caused by disturbance from the start of positioning control, and an information processing apparatus using them.

2. Description of the Related Art

For disk devices, such as magnetic disk device and optical disk devices, accurately positioning the head on the target track is extremely important to improve recording density.

Recently the application fields of disk devices are widening, not only for computers but also for portable electronic equipment and car navigation devices, etc. This spread of the application range means that disk devices receive various disturbances unlike prior art.

Generally the resonance frequency of a disk device is measured and the resonance frequency component is suppressed using a filter. Performing disturbance suppression control by learning disturbance using adaptive control has also been proposed (e.g. Japanese Patent Application Laid-Open No. 2000-21104).

Such disturbance countermeasures are based on the assumption that disturbance is unknown. Or it is assumed that disturbance is known and the frequency thereof does not change. For example, in adaptive control to follow up to the periodic disturbance, the initial frequency at which adaptive control operates is arbitrary, such as a value at the center of the frequency range where follow up is possible.

However as the application fields of disk devices spread, it is demanded to support not only the case of unknown disturbance frequency, but also the case when the disturbance frequency is known but changes, or the case when the disturbance frequency received by the disk device is unknown but is specific.

For example, mechanical resonance is generated between a disk device and the casing in which the disk device is installed. The disk device is supported on the casing by screws, rubbers or elastic materials. Therefore vibration is generated from the excitation source which is the reactive force to seek operation of the disk device. This frequency can be estimated in advance but changes depending on the type of the casing in which the disk device is installed.

Another example is vibration of another machine installed in the device where the disk device is installed. Specific examples are a vibrator of the portable telephone and the optical drive of a notebook personal computer and desk top personal computer. The vibrator generates vibration at a predetermined frequency. In an optical drive, vibration synchronizing with the rotation of the disk is generated according to the eccentricity of the disk to be mounted. These vibration frequencies are in many cases predetermined, or can be estimated. However the other equipments are not always operating, so the disturbance frequency is known but is not constant after all.

In conventional control against disturbance, it takes time to handle a disturbance of which frequency is known but not constant or disturbance of which frequency is unknown but specific not at random, and it is difficult to perform disturbance control, particularly against external vibration, immediately. For example, in the case of the above mentioned adaptive control to follow up the periodic disturbance, the initial frequency at which the adaptive control operates is set to a center value of the frequency range where follow up is possible, so it takes time to adapt to such disturbance frequency by learning.

Also as track density increases in the current situation, if the adaptation of such disturbance frequency delays, read errors and write errors frequently occur. These cause a drop in the read/write characteristics.

SUMMARY OF THE INVENTION

With the foregoing in view, it is an object of the present invention to provide a disk device, a positioning control circuit and information processing apparatus for preventing the vibration of the head by immediately handling the disturbance frequency of which frequency is known but changes, or frequency which is unknown but specific.

It is another object of the present invention to provide a disk device, a positioning control circuit and information processing apparatus for preventing the vibration of the head by immediately handling the disturbance frequency from other equipment installed.

It is still another object of the present invention to provide a disk device, a positioning control circuit and an information processing apparatus for preventing the vibration of the head by immediately handling the disturbance frequency according to the installed status.

To achieve these objects, a disk device of the present invention has a head for at least reading a disk, an actuator for moving the head in a radius direction of the disk, a control unit for computing a control amount of the actuator according to a position error between a target position and a current position acquired from the read output of the head, computing a disturbance suppression control amount according to the position error, and driving the actuator using the control amount and the disturbance suppression control, and an interface circuit for receiving information on the disturbance frequency to be suppressed from the outside. And the control unit sets the disturbance frequency received by the interface circuit to an initial value of computing the disturbance suppression control amount.

An information processing apparatus of the present invention has a disk device and a processing unit for at least reading the data of the disk device and processing the data. The disk device has a head for at least reading a disk, an actuator for moving the head in a radius direction of the disk, a control unit for computing the control amount of the actuator according to a position error between a target position and a current position acquired from the read output of the head, computing the disturbance suppression control amount according to the position error, and driving the actuator using the control amount and the disturbance suppression control amount, and an interface circuit for connection with the outside. And the processing unit transmits the disturbance frequency information to the interface circuit of the disk device, and the control unit of the disk device sets the disturbance frequency received by the interface circuit to an initial value of computing the disturbance suppression control amount.

A position control device of the present invention has a control unit for computing a control amount of an actuator according to a position error between a target position and a current position acquired from the read output of a head, computing a disturbance suppression control amount according to the position error, and driving the actuator using the control amount and the disturbance suppression control amount, and an interface circuit for receiving information on the disturbance frequency to be suppressed from the outside. And the control unit sets the disturbance frequency received by the interface circuit to an initial value of computing the disturbance suppression control amount.

In the present invention, it is preferable that the control unit computes the disturbance suppression control amount by adaptive control according to the position error, using the received disturbance frequency as an initial value.

Also in the present invention, it is preferable that the control unit estimates the disturbance frequency according to the position error using the received disturbance frequency as an initial value, and computes the disturbance suppression control amount according to the position error using the adaptive control changed, according to the estimated disturbance frequency.

Also in the present invention, it is preferable that the interface circuit receives the target position and the disturbance frequency information from a connected processing unit.

Also in the present invention, it is preferable that the head is a head for reading and writing data on the disk.

Also in the present invention, it is preferable that the disk is a magnetic disk, and the head is a magnetic head.

Also in the present invention, it is preferable that the processing unit transmits the resonance frequency of the disk device as the disturbance frequency information.

Also it is preferable that the present invention further has a second disk device for storing data of the processing unit, wherein the processing unit transmits the rotational frequency of the second disk device to the disk device as the disturbance frequency information.

Also in the present invention, it is preferable that the processing unit transmits the resonance frequency generated by installing the disk device in a casing of the information processing device as the disturbance frequency information.

Also in the present invention, it is preferable that the processing unit transmits the resonance frequency measured after installing the disk device in a casing of the information processing device as the disturbance frequency information.

Also in the present invention, it is preferable that the processing unit transmits the rotational frequency of the second disk device acquired from the second disk device to the disk device as the disturbance frequency information.

Also in the present invention, it is preferable that the processing unit transmits the rotational frequency of the second disk device acquired from the second disk device to the disk device as the disturbance frequency information when the second disk device is driven.

Also in the present invention, it is preferable that the processing unit transmits the rotational frequency of the second disk device to the disk device as the disturbance frequency information when the second disk device is driven.

In the present invention, a known disturbance frequency is set to an initial value in a positioning system having a disturbance suppression function from the outside, so operation can be started immediately from the known disturbance frequency, and an estimated frequency can follow up even if the frequency changes thereafter, and the vibration of the head can be quickly prevented.

BRIEF DESCRIPTION OF THE DRAWINGS

FIG. 15 is a flow chart depicting the disturbance frequency setting processing according to the second embodiment of the present invention;

FIG. 16 is a flow chart depicting the disturbance frequency setting processing according to the third embodiment of the present invention; and FIG. 17 is a flow chart depicting the disturbance frequency setting processing according to the fourth embodiment of the present invention.

DESCRIPTION OF THE PREFERRED EMBODIMENTS

Embodiments of the present invention will now be described in the sequence of disk device, positioning control system, first embodiment, second embodiment, third embodiment, fourth embodiment and other embodiments, but the present invention is not limited to these embodiments.

Disk Device

Figure 1:
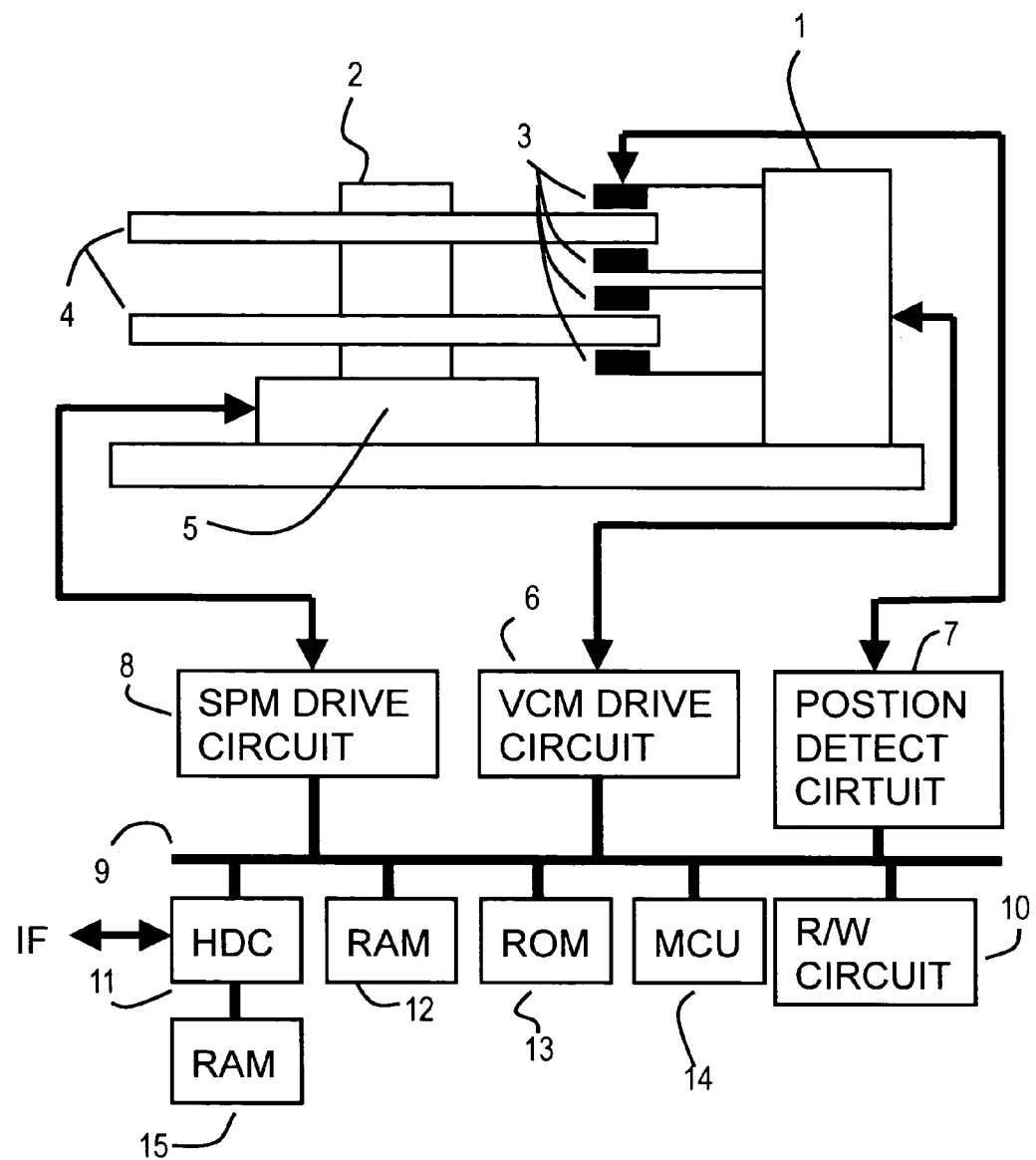
FIG. 1 is a block diagram depicting a disk device according to an embodiment of the present invention.
Figure 2:
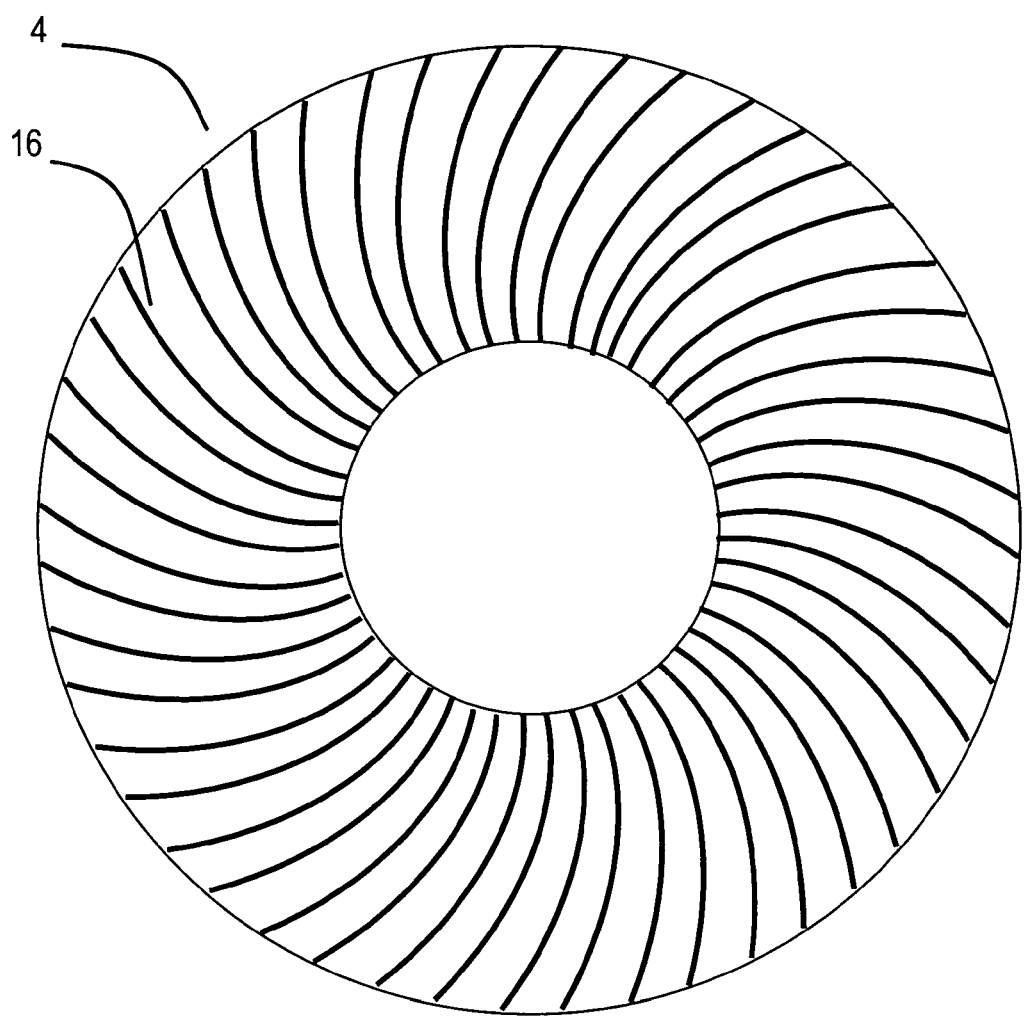
FIG. 2 is a diagram depicting a configuration of the disk medium in FIG. 1.
Figure 3:
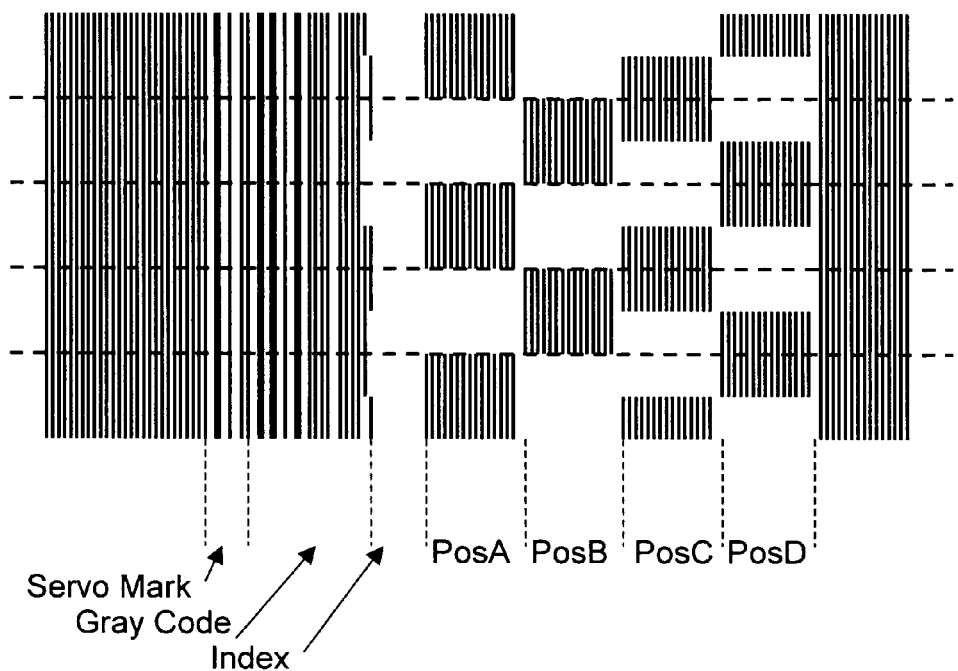
FIG. 3 is a diagram depicting a servo signal in FIG. 2.
Figure 4:
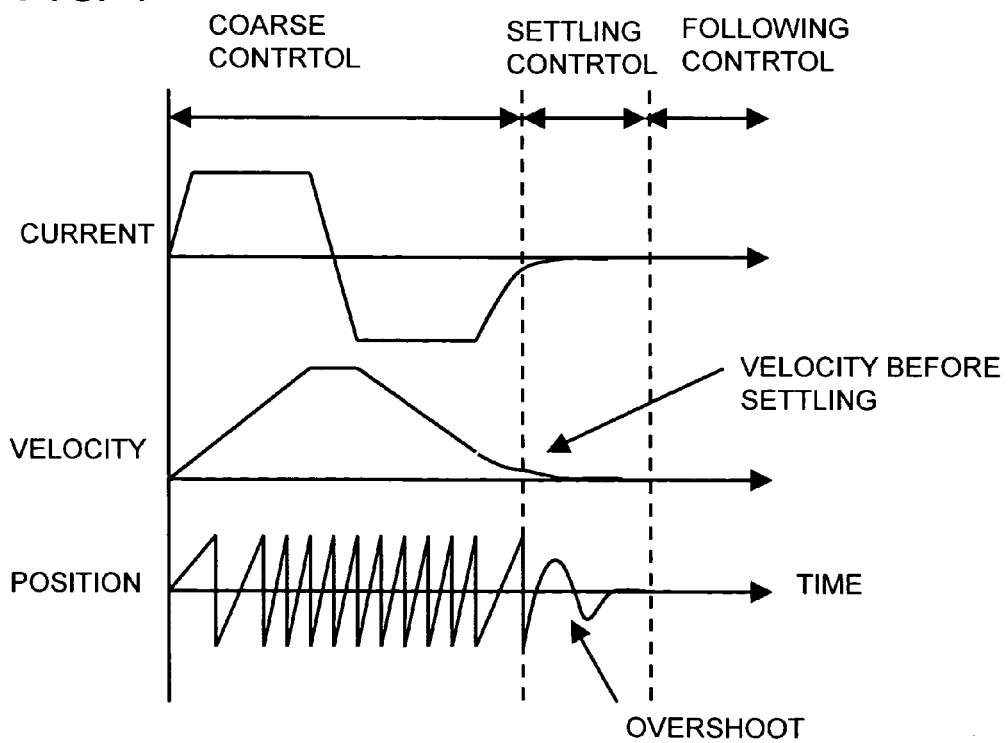
FIG. 4 is a diagram depicting a transition of a head movement control in FIG. 1 and FIG. 3.

FIG. 1 is a block diagram depicting the disk device according to an embodiment of the present invention, FIG. 2 is a diagram depicting the arrangement of the position signals on the magnetic disk in FIG. 1, FIG. 3 is a diagram depicting the configuration of the position signals of the magnetic disk in FIG. 1 and FIG. 2, and FIG. 4 is a diagram depicting the head position control in FIG. 1.

FIG. 1 shows a magnetic disk device as an example of the disk device. As FIG. 1 shows, magnetic disks 4, which is a magnetic storage medium, are installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic head 3 are simultaneously driven by the same actuator 1.

The magnetic head 3 has a read element and a write element. The magnetic head 3 is comprised of a read element, including a magneto-resistance (MR) element, stacked on a slider, and a write element, including a write coil, stacked thereon.

A position detection circuit 7 converts the position signals (analog signals) read by the magnetic head 3 into digital signals. A read/write (R/W) circuit 10 controls the read and write of the magnetic head 3. A spindle motor (SPM) drive circuit 8 drives the spindle motor 5. A voice coil motor (VCM) drive circuit 6 supplies the drive current to the voice coil motor (VCM) 1 and drives the VCM 1.

A micro controller (MCU) 14 detects (demodulates) the current position from the digital position signals from the position detection circuit 7, and calculates the VCM drive instruction value according to the error between the detected current position and the target position. In other words, the micro controller 14 demodulates the position and performs servo control including disturbance suppression which will be described in FIG. 5 and later. A read only memory (ROM) 13 stores the control program of the MCU 14. A random access memory (RAM) 12 stores the data for processing of the MCU 14.

A hard disk controller (HDC) 11 judges a position in one track based on the sector number of the servo signal, and records/regenerates the data. A buffer RAM (random access memory) 15 temporarily stores the read data or write data. The HDC 11 communicates with a host via an interface IF, such as USB (Universal Serial Bus), ATA or SCSI (Small Computer System Interface). A bus 9 connects these composing elements.

As FIG. 2 shows, a magnetic disk 4 has servo signals (position signals) 16 which are arranged on each track in the circumference direction from the outer circumference to the inner circumference, at an equal interval. Each track has a plurality of sectors, and the sold line in FIG. 2 indicates a position where the servo signals 16 are recorded. As FIG. 3 shows, the position signal is comprised of a servo mark ServoMark, track number GrayCode, index Index and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and offset information PosA, PosB, PosC and PosD. Also the position of the magnetic head in the circumference direction is acquired based on the index signal Index.

For example, the sector number when the index signal is detected is set to No. 0, which is counted up every time the servo signal is detected so as to acquire the sector number of each sector of a track. The sector number of the servo signal is used as a reference when recording and reproducing data. There is one index signal in one track. The sector number may be set instead of the index signal.

FIG. 4 is an example of the seek control of the actuator executed by the MCU 14 in FIG. 1. The MCU 14 confirms the position of the actuator through the position detection circuit 7 in FIG. 1, performs servo computation, and supplies appropriate current to the VCM 1. FIG. 4 shows the transition of the control from the start of seeking when the head 3 is moved from a certain track position to the target track position, current of the actuator 1, velocity of the actuator (head) and position of the actuator (head).

In other words, in seek control, the head is moved to the target position through the transition from coarse control, settling control and following control. Coarse control is basically a velocity control, and settling control and following control are basically position controls for both of which the current position of the head must be detected.

To confirm the position like this, the servo signals are recorded on the magnetic disk in advance, as mentioned in FIG. 2. In other words, FIG. 3 shows servo marks which the start position of the servo signal, gray code which indicates the track number, index signal, and PosA—PosD which indicate the offset recorded in advance. These signals are read by the magnetic head, and these servo signals are converted into digital values by the position detection circuit 7.

Positioning Control System

Figure 5:
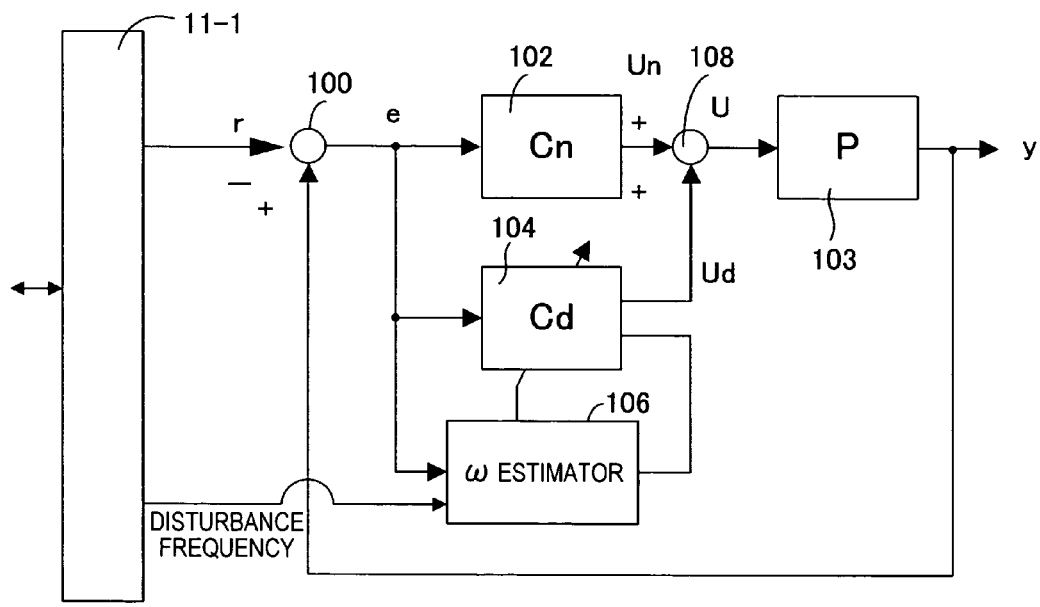
FIG. 5 is a block diagram depicting a positioning control system in FIG. 1.

FIG. 5 is a block diagram depicting the first embodiment of the positioning control system for suppressing disturbance, executed by the MCU 14 in FIG. 1. This positioning control system is a control system for detecting the disturbance frequency and suppressing sine wave type disturbance having a predetermined frequency.

A position error "e" between a target position "r" supplied from the interface circuit 11-1 (in HDC 11) and an observation position "y" is computed by a computing unit 100. This position error "e" is input to a controller 102 (Cn) for performing feedback control. The controller 102 outputs a control current value Un by known PID control, PI control+ LeadLag, and observer control.

To this controller 102, a frequency estimation unit (ω estimation) 106 for estimating the frequency of the disturbance, and a compensator (Cd) 104 for suppressing disturbance having a specific frequency are added.

To the control target 103 (P), a control output U, which is a sum of the output Un of the controller 102 (Cn) and the output Ud of the compensator 104 (Cd), is supplied. By this, the position of the head 3 driven by the actuator 1, which is the control target 103, is controlled so as to follow up the disturbance. In other words, the device is vibrated by the disturbance so the position of the head 3 is controlled with respect to the magnetic disk 4 so as to follow up the disturbance, therefore the positional relationship between the head 3 and the magnetic disk 4 does not change.

The frequency estimation unit 106 estimates the angular frequency ω (=2πf) of the disturbance based on the position error "e", and supplies it to the transfer function of the disturbance frequency suppression of the compensator 104. The compensator 104 computes the recurrence formula (adaptive control formula) of a sine wave from the position error "e" and the estimated angular frequency ω, and computes the compensated current output Ud.

In this way, the frequency of disturbance is detected to handle disturbance having an unknown frequency in a certain range, and disturbance with this unknown frequency is suppressed. A method for estimating this unknown frequency and suppressing disturbance with the unknown frequency assumes a recurrence formula of a sine wave, or correcting the drive amount of the control target using an adaptive rule based on the above mentioned error signal "e". Another method for estimating the unknown frequency from the error signal "e", generating the disturbance suppression signal on the position level, correcting the error signal thereof, and inputting the corrected error signal to the controller, can be applied.

Here according to the present invention, the interface circuit 11-1 receives the disturbance suppression frequency from the outside, and sets it in the frequency estimation unit 106 as an initial value of the frequency estimation unit 106 (initial value of angular frequency of the disturbance). Therefore the compensator 104 performs adaptive control from this initial value.

In other words, the initial value of the frequency estimation unit 106, which is based on the assumption that the disturbance frequency is unknown, is normally set to the center of the follow up range, and gradually reaches the disturbance frequency from the position error "e", but in the case of the present invention, a known disturbance frequency is set to the initial value, so positioning control immediately starts from a known disturbance frequency, and the estimated frequency follows up the subsequent change of the frequency.

Figure 6:
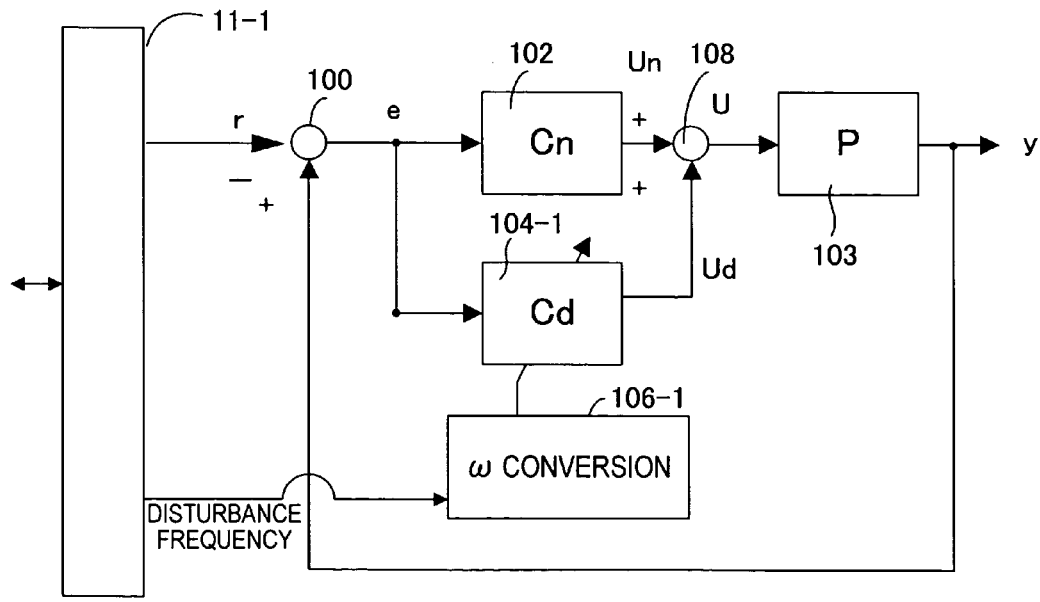
FIG. 6 is a block diagram depicting another positioning control system in FIG. 1.

FIG. 6 is a block diagram depicting the second embodiment of the positioning control system for suppressing disturbance, executed by the MCU 14 in FIG. 1. This positioning control system is a control system for detecting a disturbance frequency and suppressing a sine wave type disturbance having a predetermined frequency.

A position error "e" between a target position "r" supplied from the interface circuit 11-1 (in HDC 11) and an observation position "y" is computed by a computing unit 100. This position error "e" is input to a controller 102 (Cn) for performing feedback control. The controller 102 outputs a control current value Un by known PID control, PI control+ LeadLag and observer control.

To this controller 102, a frequency converter (ω estimation) 106-1 for converting the frequency of disturbance into a corresponding angular frequency, and a compensator (Cd) 104-1 for suppressing a disturbance having a specific frequency, are added.

To the control target 103 (P), a control output U, which is a sum of the output Un of the controller 102 (Cn), and the output Ud of the compensator 104-1 (Cd), is supplied. By this, the position of the head 3 driven by the actuator 1, which is the control target 103, is controlled so as to follow up the disturbance. In other words, the device is vibrated by the disturbance, so the position of the head 3 is controlled with respect to the magnetic disk 4 so as to follow up the disturbance, therefore the positional relationship between the head 3 and the magnetic disk 4 does not change.

The frequency converter 106-1 sets the angular frequency ω (=2πf) to an inverted notch filter for disturbance frequency suppression of the compensator 104-1. The compensator 104-1 performs the inverted notch filter processing in which the angular frequency ω is set with regard to the position error "e", and calculates the compensated current output Ud.

In this way, in order to handle a disturbance frequency having a specific frequency, an interface circuit 11-1 receives the disturbance suppression frequency from the outside, and sets it in the frequency converter 106-1. Therefore the compensator 104-1 suppresses the disturbance frequency using this initial value (angular frequency).

In the case of the present invention, a known disturbance frequency is set to the initial value like this, so the filter characteristics of the compensator 104-1 can be set correspondingly to the known disturbance frequency, and the compensated current Ud follows up to it accordingly.

In this way, the positioning control system has a means of changing the internal constant (angular frequency in the case of the example in FIG. 5 and FIG. 6) or configuration according to the set value of the disturbance frequency to be selectively suppressed, and the disturbance frequency can be referred to or set from the outside via the interface 11-1.

In the tables of the frequency estimation unit 106 and frequency converter 106-1 shown in FIG. 5 and FIG. 6, it is preferable that the values are maintained even if power is shown down. So the values which are set in the tables are stored in a non-volatile memory area, such as a flash memory, EEPROM or system area on a disk, in advance. It is better to store the values in a table in such a way that the values can be used when the power is turned ON again.

Figure 7:
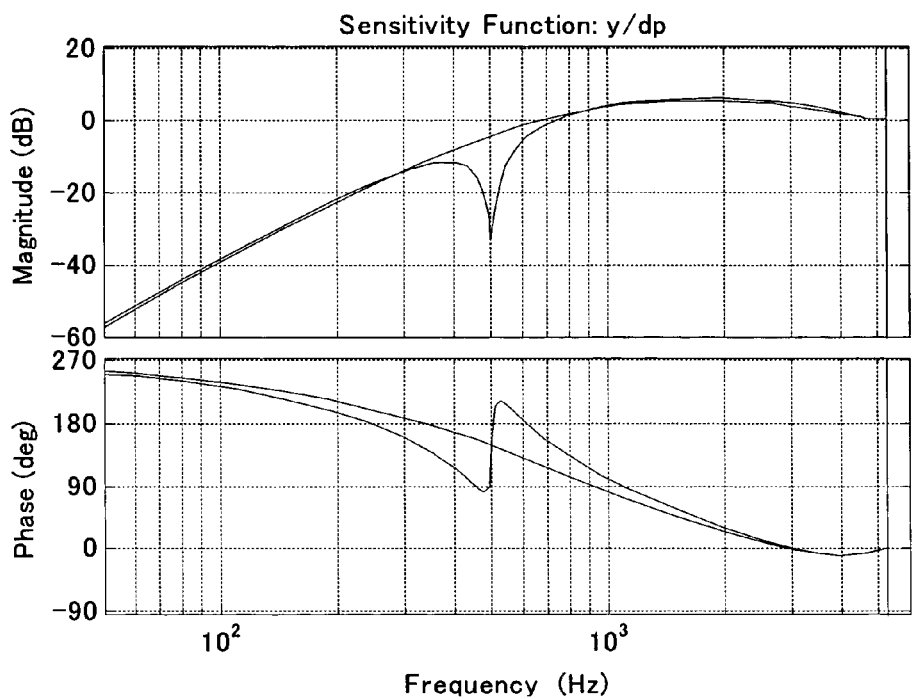
FIG. 7 is characteristic diagram of a sensitivity function in FIG. 5 and FIG. 6.

FIG. 7 shows an example of the sensitivity function of the positioning control system in FIG. 5 and FIG. 6. The top graph shows the characteristics of frequency versus magnitude and the bottom graph shows the characteristics of frequency versus phase. In each characteristic, one (as shown in dotted lines in Figures) of the two lines, where a frequency around 500 Hz is suppressed in the notch filer form, is an example of the control system used for the present invention.

As described above, the frequency to be suppressed can be referred to or set from the outside. Also as FIG. 7 shows, it is preferable to suppress a wide range around the specific frequency since the positioning control system can handle the shift between the set value of the disturbance frequency and actual value are shifted, even if it is generated.

Figure 8:
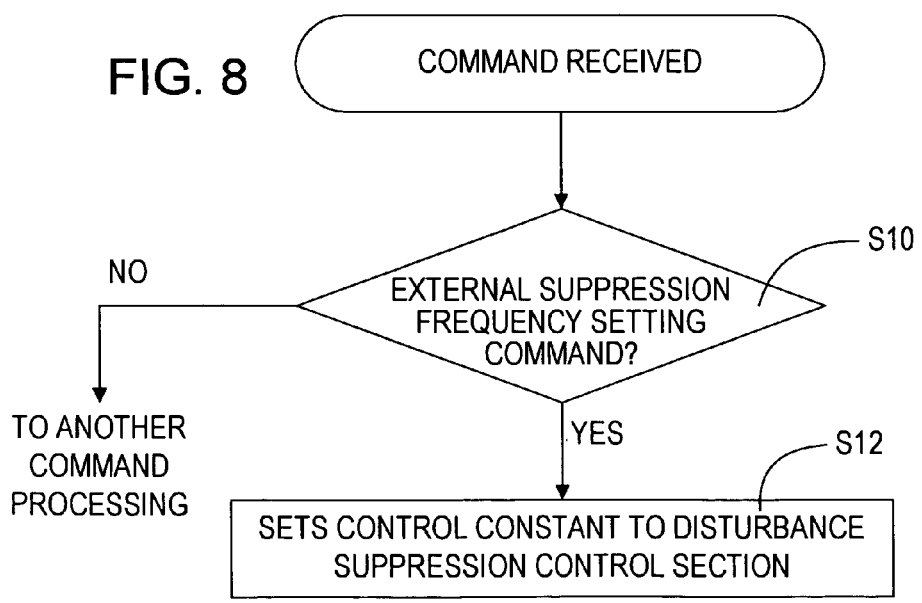
FIG. 8 is a flow chart depicting the disturbance frequency setting processing in FIG. 1.

FIG. 8 is a flow chart depicting the external frequency setting processing of the MCU 14 in FIG. 1.

(S10) The MCU 14 receives a command from the interface circuit 11-1 of the HDC 11, and judges whether this command is an external suppression frequency setting command. If the command is not an external suppression frequency setting command, the processing moves to another command processing.

(S12) If the received command is the external suppression frequency setting command, the MCU 14 sets the command to the disturbance suppression control section (e.g. frequency estimation unit 106 in FIG. 5, or frequency converter 106-1 in FIG. 6).

In this way, the vibration of the head can be prevented by immediately responding to the disturbance frequency, of which frequency is known but changes.

First Embodiment

Figure 9:
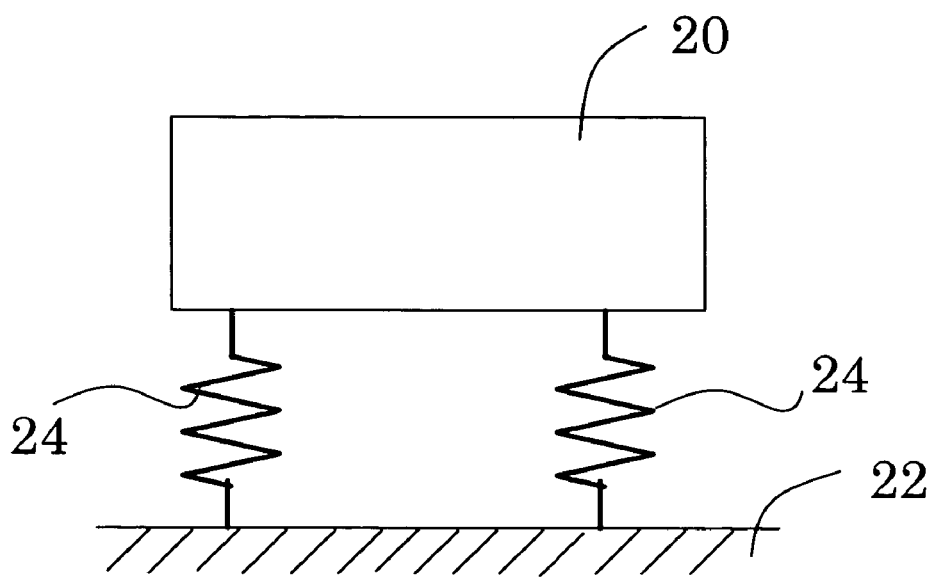
FIG. 9 is a diagram depicting the first embodiment of the present invention.
Figure 10:
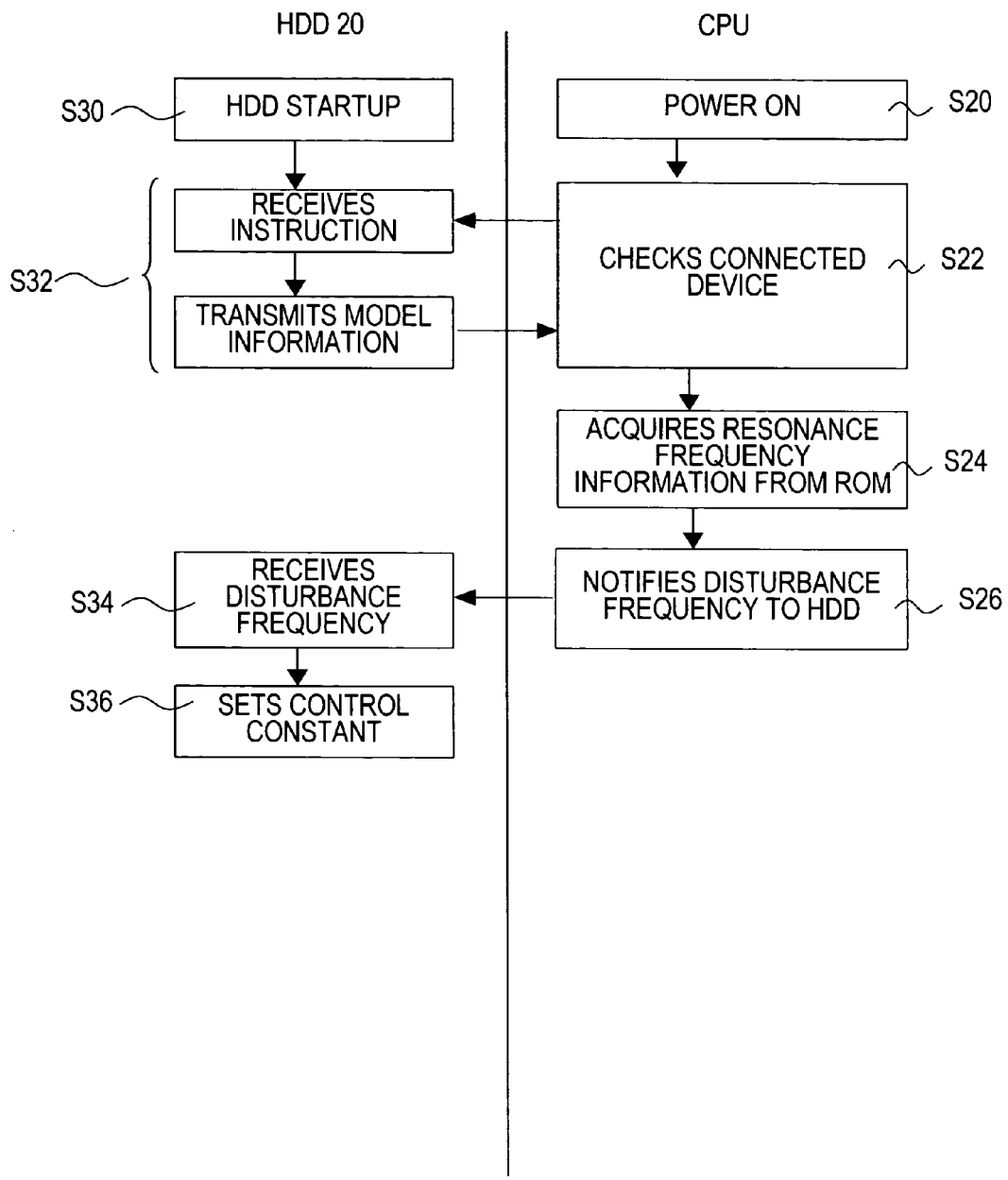
FIG. 10 is a flow chart depicting the disturbance frequency setting processing of the first embodiment in FIG. 9.

FIG. 9 is a diagram depicting the first embodiment of the present invention, and FIG. 10 is a flow chart depicting the processing of the first embodiment of the present invention.

FIG. 9 shows the state where a disk device 20 is supported on the casing 22 of the device. The disk device 20 has the configuration shown in FIG. 1, and has the positioning system in FIG. 5 or FIG. 6.

As FIG. 9 shows, the disk device 20 is fixed to the casing 22 using an elastic material 24, such as rubber, or screws. The resonance frequency which the disk device 20 has is different depending on the fixing status. The resonance frequency is determined by the type of the disk device, the type of the casing to which the disk device is installed, and by the type of the installing elements. In other words, the resonance frequency cannot be determined by the disk device 20 alone, but can be determined by the manufacturer which encloses the disk device 20. In other words, the supplier of the disk device, which does not know the intended use of the disk device, cannot set a specific resonance frequency to an internal constant in the control system.

In other words, the resonance frequency can be estimated when a system, including the CPU which uses the disk device, is designed. Therefore the resonance frequency is measured when the system integrating the disk device is designed. For example, in a status where the disk device is installed, as shown in FIG. 9, an acceleration sensor is installed, and the resonance frequency is measured by driving the actuator 1 of the disk device, and by applying vibration. This measured result is stored in the CPU in advance.

Then the power of the CPU is turned ON, as shown in FIG. 10, (S20), and the disk device 20 is also started (S30). The CPU checks the connected device (S32). If a device is connected to the CPU, the disk device 20 receives an instruction from the CPU and transmits the model information to the CPU (S32).

The CPU receives the stored resonance frequency information corresponding to the model from the ROM (Read Only Memory) (S24). The CPU notifies the acquired disturbance frequency (resonance frequency) to the disk device 20 (S26).

The disk device 20 receives the above mentioned disturbance frequency notified via the interface circuit 11-1 (S34), and initially sets the control constant to the disturbance suppression control section, as mentioned above (S36). Therefore the disturbance frequency according to the installed status of the disk device can be suppressed from the beginning, and disturbance suppression control can be performed following up to the disturbance frequency which fluctuates due to such an element as elastic material 20.

Second Embodiment

Figure 11:
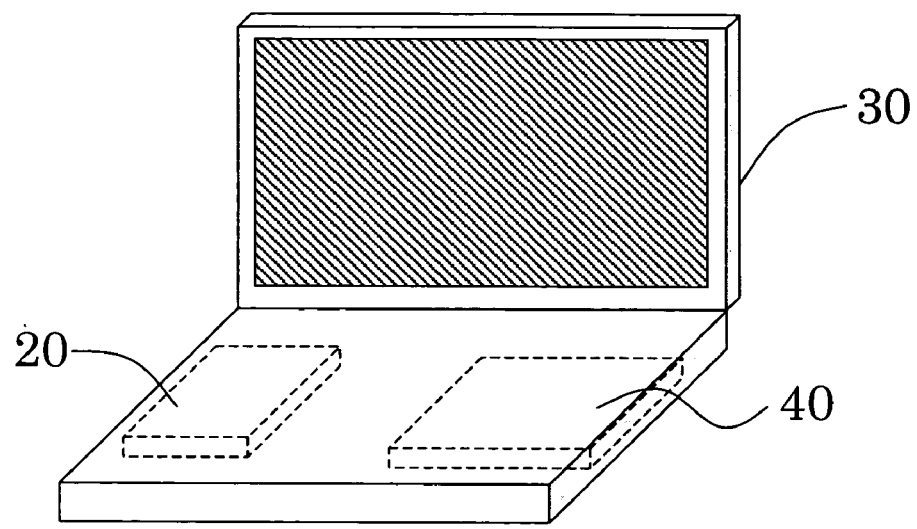
FIG. 11 is a diagram depicting the configuration of the information processing device according to the first embodiment of the present invention.
Figure 12:
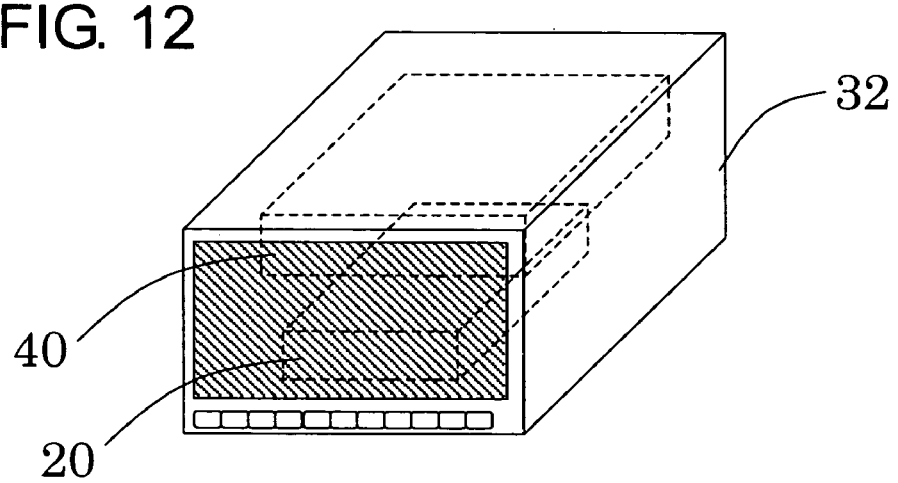
FIG. 12 is a diagram depicting the configuration of the information processing device according to the second embodiment of the present invention
Figure 13:
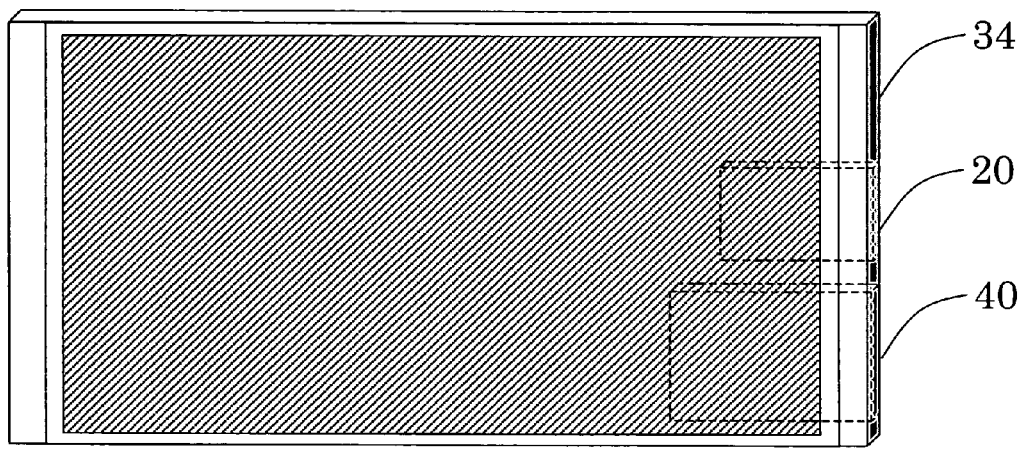
FIG. 13 is a diagram depicting the configuration of the information processing device according to the third embodiment of the present invention

FIG. 11 to FIG. 13 show examples of devices where a magnetic disk deice 20 is enclosed. FIG. 11 shows a system where a magnetic disk device 20 and an optical disk device 40 are installed in one casing of a notebook personal computer 30. FIG. 12 shows a system where a magnetic disk device 20 and an optical disk device 40 are installed in one casing of a navigation device 32. FIG. 13 shows a system where a magnetic disk device 20 and an optical disk device 40 are installed in a slim type panel display device 34, such as a plasma display and a liquid crystal display.

This optical disk device reads/writes a DVD, CD-R, CD-RW or the like and uses optical disks. The optical disk is a replaceable medium, and the eccentricity of the disk which is loaded changes each time a disk is set. Accordingly, vibration synchronizing rotation is generated. Depending on the type of rotation control of the optical disk, the rotational frequency is changed according to the radius position of the optical head, or the rotational frequency is controlled always with a predetermined rotational frequency.

Figure 14:
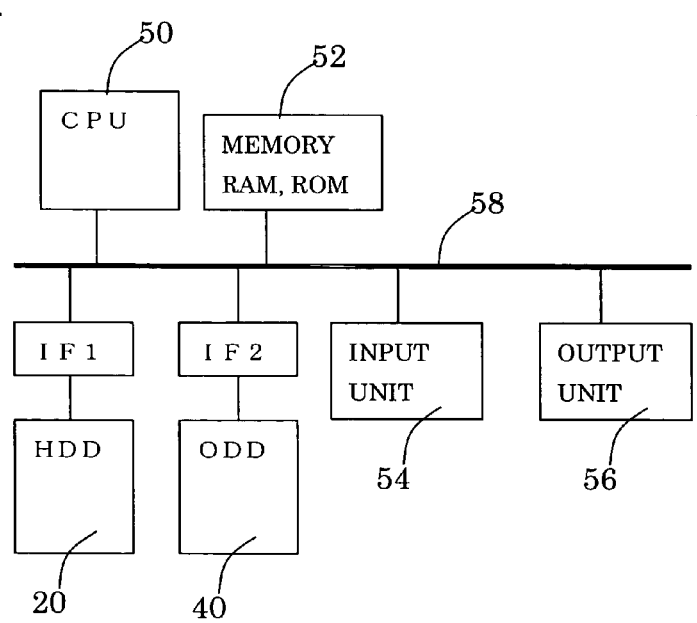
FIG. 14 is a block diagram depicting an information processing device according to an embodiment of the present invention.

FIG. 14 is a block diagram depicting the system in FIG. 11 to FIG. 13. The magnetic disk device 20, optical disk device 40, input unit 54 such as a keyboard, output unit 56 such as a display unit, CPU 50 and memory 52 are connected via the bus 58.

In this configuration, the external frequency to be set is stored in the memory 52 in advance, and the CPU 50 reads the external frequency of the memory 52, and sets it in the magnetic disk device 20.

FIG. 15 is a flow chart depicting the setting processing according to the second embodiment of the present invention. This embodiment shows the setting processing when the rotational frequency of the optical disk device is variable.

The CPU 50 instructs the optical disk device 40 to transmit the current rotational frequency (S40). The optical disk device 40 receives an instruction to transmit the rotation frequency from the CPU 50 (S50), and transmits the rotational frequency to the CPU 50 (S52).

The CPU 50 receives the rotational frequency from the optical disk 50 (S42), and notifies the received disturbance frequency (rotational frequency) to the magnetic disk device 20 (S44).

The magnetic disk device 20 receives the above mentioned notified disturbance frequency via the interface circuit 11-1 (S60), and initially sets the control constant to the disturbance suppression control section, as mentioned above (S62).

The CPU 50 transmits/receives the rotational frequency at an arbitrary timing (e.g. predetermined interval) so the disturbance frequency according to the rotational frequency can be suppressed from the beginning, even if the rotational frequency of the optical disk device 40 is variable, and disturbance suppression control can be performed by following up to the disturbance frequency even if it fluctuates.

Third Embodiment

FIG. 16 is a flow chart depicting the setting processing according to the third embodiment of the present invention. This embodiment shows the setting processing when the rotational frequency of the optical disk device is variable. Also in this embodiment, the CPU reads the rotation frequency of the optical disk device, and notifies it to the magnetic device each time the optical disk is accessed.

The CPU 50 performs read/write processing to a file of the optical disk device 40 (S60), and instructs the optical disk device 40 to read/write data (S62). The optical disk device 40 receives the read/write command (S70), executes the read/write processing, and transmits a completion report or data (S72). The CPU 50 receives the completion report or data from the optical disk device 40 (S64), and instructs the optical disk deice 40 to transmit the current rotational frequency (S66). The optical disk deice 40 receives the instruction to transmit the rotational frequency of the CPU 50, and transmits the rotational frequency to the CPU 50 (S74).

The CPU 50 receives the rotational frequency from the optical disk device 50, and notifies the received disturbance frequency (rotational frequency) to the magnetic disk device 20 (S68). The magnetic disk device 20 receives the above mentioned notified disturbance frequency via the interface circuit 11-1, and initially sets the control constant to the disturbance suppression control section, as mentioned above (S80).

The CPU 50 transmits/receives the rotational frequency for each file processing of the optical disk, the disturbance frequency according to the rotational frequency can be suppressed from the beginning even if the rotational frequency of the optical disk device 40 is variable, and the disturbance suppression control can be performed by following up to the disturbance frequency even if it fluctuates.

Fourth Embodiment

FIG. 17 is a flow chart depicting the setting processing according to the fourth embodiment of the present invention. This embodiment shows the setting processing when the rotational frequency of the optical disk device is fixed. Also in this embodiment where the rotational frequency of the optical disk device is fixed, the CPU 50 holds the rotational frequency (disturbance frequency) in the memory 52, and notifies this to the magnetic disk device.

The CPU 50 performs read/write processing of a file of the optical disk device 40 (S90), and sets the transfer rate (rotational frequency) to read the target LBA (Logical Block Address) in the optical disk device 40. The optical disk device 40 sets the rotational frequency of the optical disk to the specified value (S100).

The CPU 50 notifies the specified disturbance frequency (rotational frequency) to the magnetic disk device 20 (S94). The magnetic disk device 20 receives the above mentioned notified disturbance frequency via the interface circuit 11-1, and initially sets the control constant to the disturbance suppression control section, as mentioned above (S110).

The CPU 50 instructs to read/write the data (S96). The optical disk device 40 receives the read/write command (S102), executes the read/write processing, and transmits the completion report or data (S104). The CPU 50 receives the completion report or data from the optical disk device 40 (S98).

The CPU 50 transmits the rotational frequency for each file processing of the optical disk, so the disturbance frequency according to the rotational frequency can be suppressed from the beginning even if the rotational frequency of the optical disk device 40 is fixed, and disturbance suppression control can be performed by following up to the disturbance frequency even if it fluctuates.

In this way, in all these control methods, the rotational frequency of the optical disk can be detected from the host device, and the rotational frequency of the optical disk device can be transferred to the magnetic disk device, and vibration oscillating at the rotational frequency can be suppressed.

Other Embodiments

In the first embodiment, the disk device was described to use a magnetic disk device, but the present invention can also be applied to other disk devices, such as an optical disk device and magneto-optical disk device. The positioning control system was described using the configuration in FIG. 5 and FIG. 6, but other configurations may be used.

The present invention was described above using embodiments, but the present invention can be modified in various ways within the scope of the essential character of the present invention, and these variant forms shall not be excluded from the scope of the present invention.

Since a known disturbance frequency is set to an initial value from the outside in the positioning system having the disturbance suppression function, an unknown disturbance frequency can be immediately suppressed or disturbance frequency control can be started from a known disturbance frequency immediately, and even if the frequency changes thereafter, the estimated frequency can follow up to the disturbance, and the vibration of the head can be quickly prevented.

What is claimed is:

1. A disk device, comprising:
   a head for at least reading a disk;
   an actuator for moving the head in a radius direction of the disk;
   a control unit for computing a control amount of the actuator according to a position error between a target position and a current position acquired from read output of the head, computing a disturbance suppression control amount according to the position error, and driving the actuator using the control amount and the disturbance suppression control amount; and
   an interface circuit for receiving information on disturbance frequency to be suppressed from outside,
   wherein the control unit sets the disturbance frequency received by the interface circuit to an initial value of computing the disturbance suppression control amount,
   wherein the interface circuit receives the target position and the disturbance frequency information from a connected processing unit.

2. The disk device according to claim 1, wherein the control unit computes the disturbance suppression control amount by adaptive control according to the position error using the received disturbance frequency as an initial value.

3. The disk device according to claim 1, wherein the head comprises a head for reading and writing data on the disk.

4. The disk device according to claim 1, wherein the disk comprises a magnetic disk, and the head comprises a magnetic head.

5. A disk device, comprising:
   a head for at least reading a disk;
   an actuator for moving the head in a radius direction of the disk;
   a control unit for computing a control amount of the actuator according to a position error between a target position and a current position acquired from read output of the head, computing a disturbance suppression control amount according to the position error, and driving the actuator using the control amount and the disturbance suppression control amount; and
   an interface circuit for receiving information on disturbance frequency to be suppressed from outside,
   wherein the control unit sets the disturbance frequency received by the interface circuit to an initial value of computing the disturbance suppression control amount,
   wherein the control unit estimates the disturbance frequency according to the position error using the received disturbance frequency as an initial value, and computes a changed disturbance suppression control amount according to the position error using adaptive control.

6. An information processing device, comprising:
   a disk device; and
   a processing unit for at least reading data of the disk device and processing the data,
   wherein said disk device comprises:
   a head for at least reading a disk;
   an actuator for moving the head in a radius direction of the disk;
   a control unit for computing a control amount of the actuator according to a position error between a target position and a current position acquired from the read output of the head, computing a disturbance suppression control amount according to the position error, and driving the actuator using the control amount and the disturbance suppression control amount; and
   an interface circuit for connection with outside,
   wherein the processing unit transmits disturbance frequency information to the interface circuit of the disk device,
   wherein the control unit of the disk device sets the disturbance frequency received by the interface circuit to an initial value of computing the disturbance suppression control amount, and
   further comprising a second disk device for storing data of the processing unit,
   wherein the processing unit transmits a rotational frequency of the second disk device to the disk device as the disturbance frequency information.

7. The information processing device according to claim 6, wherein the processing unit transmits the resonance frequency of the disk device as the disturbance frequency information.

8. The information processing device according to claim 7, wherein the processing unit transmits a resonance frequency generated by installing the disk device in a casing of the information processing device as the disturbance frequency information.

9. The information processing device according to claim 8, wherein the processing unit transmits the resonance frequency measured after installing the disk device in a casing of the information processing device as the disturbance frequency information.

10. The information processing device according to claim 6, wherein the processing unit transmits the rotational frequency of the second disk device acquired from the second disk device to the disk device as the disturbance frequency information.

11. The information processing device according to claim 10, wherein the processing unit transmits the rotational frequency of the second disk device acquired from the second disk device to the disk device as the disturbance frequency information when the second disk device is driven.

12. The information processing device according to claim 6, wherein the processing unit transmits the rotational frequency of the second disk device to the disk device as the disturbance frequency information when the second disk device is driven.

13. The information processing device according to claim 6, wherein the control unit computes the disturbance suppression control amount by adaptive control according to the position error using the received disturbance frequency as an initial value.

14. The information processing device according to claim 6, wherein the interface circuit receives the target position and the disturbance frequency information from the connected processing unit.

15. The information processing device according to claim 6, wherein the disk comprises a magnetic disk and the head comprises a magnetic head.

16. An information processing device, comprising:
a disk device; and
a processing unit for at least reading data of the disk device and processing the data,
wherein said disk device comprises:
a head for at least reading a disk;
an actuator for moving the head in a radius direction of the disk;
a control unit for computing a control amount of the actuator according to a position error between a target position and a current position acquired from the read output of the head, computing a disturbance suppression control amount according to the position error, and driving the actuator using the control amount and the disturbance suppression control amount; and
an interface circuit for connection with outside,
wherein the processing unit transmits disturbance frequency information to the interface circuit of the disk device,
wherein the control unit of the disk device sets the disturbance frequency received by the interface circuit to an initial value of computing the disturbance suppression control amount, and
wherein the control unit estimates the disturbance frequency according to the position error using the received disturbance frequency as an initial value, and computes a changed disturbance suppression control amount according to the position error using adaptive control.

17. A positioning control device, comprising:
a control unit for computing a control amount of an actuator according to a position error between a target position and a current position acquired from read output of a bead, computing a disturbance suppression control amount according to the position error, and driving the actuator using the control amount and the disturbance suppression control amount; and
an interface circuit for receiving disturbance frequency to be suppressed from outside,
wherein the control unit sets the disturbance frequency received by the interface circuit to an initial value of computing the disturbance suppression control amounts, and
wherein the interface circuit receives the target position and the received disturbance frequency from a connected processing unit.

18. The positioning control device according to claim 17, wherein the control unit computes the disturbance suppression control amount by adaptive control according to the position error, using the received disturbance frequency as an initial value.

* * * * *